3,297,651
PROCESS FOR THE PRODUCTION OF
SPINNABLE POLYESTERS
Gabor Halmi, Frankfurt am Main, Germany, and Ram
Advani, Bombay, India, assignors to Hans J. Zimmer
Verfahrenstechnik, Frankfurt am Main, Germany
No Drawing. Filed Mar. 18, 1963, Ser. No. 266,056
Claims priority, application Germany, Mar. 23, 1962,
Z 9,324
1 Claim. (Cl. 260—75)

In the production of polyesters from dimethyl terephthalate by transesterification with ethylene glycol to form ethylene glycol terephthalate and subsequent polycondensation, it is known to use catalysts to accelerate the reaction and to obtain polyesters of higher molecular weight. U.S. Patent No. 2,720,507 discloses a number of tin organic compounds for this purpose and mentions the increase in the reaction rate and the high average molecular weights which can be achieved with these catalysts. However, the use of these compounds has several disadvantages: Part of these catalysts is difficultly soluble in the starting substances and results in a relatively slow course of the reaction which is difficult to control due to the fact that the reaction mixture is not homogeneous. Others of the catalysts are difficultly soluble in the resultant polymer and thereby result in undesirable opacifying effects in the finished product, i.e. the polyester fiber. In addition, the polyesters obtained are frequently discolored and show a light yellow to dark brown color and the transesterification and polycondensation reaction is invariably sensitive to influences of the atmosphere, to moisture and small traces of acid contaminations of the starting substances.

It is an object of the invention to provide tin catalysts which are suitable for use in the production of polyesters and which are completely soluble in the reaction mixture and in the polycondensate obtained therefrom in the amounts used and consequently eliminate the risk of a discoloration of the polyesters because of the lower reaction temperature and shorter reaction periods. It further appeared that the sensitivity of the reactions to moisture and free acid is substantially reduced in the presence of these catalysts. Satisfactory solubility of the catalysts in the finished polymer permits the production of clear transparent polyesters free from haze.

The process of the invention for the production of spinnable polyesters and preferably polyethylene glycol terephthalate by transesterification and subsequent polycondensation with the addition of organic tin compounds as the catalysts comprises adding a tin organic compound of the general formula

wherein $R_1$ and $R_2$ are alkyl, aryl, alkaryl, aralkyl or cycloalkyl groups and $R_3$ and $R_4$ are radicals of dicarboxylic acid semi-esters. The radicals $R_1$ and $R_2$ may be like and the radicals $R_3$ and $R_4$ may be like.

The dicarboxylic acid semi-esters which are linked to the tin atom through their non-esterified carboxyl group consist of the monoesters of aliphatic, aromatic or hydroaromatic dicarboxylic acids such as maleic, adipic, pimelic and terephthalic acids. Suitable in general are the same dicarboxylic acids which are used in the production of polyesters, it being possible for these acids to be used alone or in mixture with other dicarboxylic acids. In case of the semi-esters which furnish two of the substituents of the tin atom, one carboxyl group of these acids is esterified by a lower aliphatic alcohol having from 1 to 6 carbon atoms.

The catalysts used in accordance with the invention can be prepared by known processes from the dialkyl, alkylaryl or diaryl tin oxides corresponding to the radicals $R_1$ and $R_2$ and from the above-mentioned semiesters of dicarboxylic acids. Particularly preferred compounds are dibutyl tin-di-methyl terephthalate, dibutyl tin-diethyl maleate and dibutyl tin-di-methyl adipate. The catalysts of the invention are preferably used in amounts of from 0.01 to 0.9% by weight, based on dimethyl terephthalate.

*Example*

1 mol dimethyl terephthalate was transesterified at temperatures of 190 to 220° with 2.2 mols ethylene glycol in the presence of 0.1% by weight of dibutyl tin-di-monomethyl terephthalate prepared by reaction of dibutyl tin oxide and terephthalic acid monomethyl ester and the excess of glycol was removed. Thereafter the temperature was gradually increased to 280° and the pressure reduced to 0.1 mm. Hg. After a polycondensation period of 2 hours, a polyester of $\eta_{intr.}$ of 0.9 measured in a 0.5% phenol tetrachloroethane solution at 20° C. was obtained. Comparable results were obtained with additions of 0.1% by weight of dibutyl tin-di-ethyl maleate prepared by reacting dibutyl tin oxide with monoethyl maleate, and of dibutyl tin-di-monoethyl adipate prepared by reacting dibutyl tin oxide with monomethyl adipate.

What is claimed is:

In the process for the production of spinnable polyethylene terephthalate by the transesterification of dimethyl terephthalate with ethylene glycol and the polycondensation of the resulting bis(hydroxyethyl)-terephthalate; the improvement which comprises catalyzing said process with an organo-tin compound selected from the group consisting of dibutyl tin-di-(methyl terephthalate); dibutyl tin-di-(ethyl maleate); and dibutyl tin-di-(methyl adipate).

References Cited by the Examiner

UNITED STATES PATENTS 2,720,507   10/1955   Caldwell _ _ _ _ _ _ _ _ _ _ _ _   260—75

FOREIGN PATENTS 577,788   6/1950   Canada.

WILLIAM H. SHORT, *Primary Examiner.*

LOUISE P. QUAST, *Examiner.*